Patented Aug. 23, 1949

2,479,632

UNITED STATES PATENT OFFICE 2,479,632

CATALYTIC PRODUCTION OF ALLYL ALCOHOL FROM PROPYLENE OXIDE

Lester G. Lundsted, Grosse Ile, and Edward J. Schwoegler and Edward C. Jacobs, Wyandotte, Mich., assignors to Wyandotte Chemicals Corporation, Wyandotte, Mich., a corporation of Michigan No Drawing. Application April 16, 1945, Serial No. 588,710

2 Claims. (Cl. 260—632)

The present invention relates to the molecular rearrangement of propylene oxide to form allyl alcohol in appreciable and commercially feasible amounts. Such molecular rearrangement is illustrated by the following chemical equation wherein one of the hydrogen atoms of the methyl group apparently joins with the oxygen atom and these two in turn migrate to linkage with the opposite terminal carbon atom:

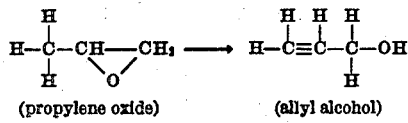

(propylene oxide)　　　(allyl alcohol)

The foregoing molecular rearrangement is in distinction to the more commonly known rearrangement or conversion of propylene oxide to the aldehyde and ketone isomers, as represented by the following equations, and wherein the oxygen atom forms a double bond linkage with one or the other of the vicinal carbon atoms, and without a disturbance of any of the hydrogen atoms in the original methyl group, viz:

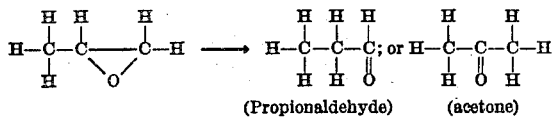

(Propionaldehyde)　　(acetone)

Prior workers in the art have been primarily concerned with the conversion of propylene oxide to propionaldehyde and acetone, employing such catalysts which selectively promote such conversion by the formation of the double bond between carbon and oxygen atoms. The primary object and nature of our invention is to inhibit the formation of the double bond linkage of the oxygen atom and to promote the hydroxyl linkage of the oxygen atom with the hydrogen of the methyl group of the propylene oxide.

Baur (U. S. Patents Nos. 1,906,833 and 2,031,200) has disclosed the use of such catalysts as the alkaline earth metal and earth metal halides, oxyhalides, phosphates and sulfates as catalytic agents promoting the propionaldehyde and acetone conversion.

Young and Law (U. S. Patent No. 1,917,179) disclose the passing of propylene oxide vapors "at a high rate of speed," through a heated catalyst chamber in which activated alumina, thoria and titania are employed as the catalysts.

We have discovered that the yield of allyl alcohol, in proportion to propionaldehyde, can be successfully increased to as much as 10 to 1; viz. to the point where allyl alcohol, rather than propionaldehyde, is the predominating product of the converted propylene oxide. Thus, in effect we have succeeded in reversing the productive results as achieved by prior workers in the art. Even in the case of the lowest yields obtained in the practice of our invention, the ratio of allyl alcohol to propionaldehyde in the propylene oxide conversion products is not less than .5 to 1, or not less than 33⅓% by weight allyl alcohol of the total amount of alcohol and aldehyde isomers produced.

A flow velocity of 100 to 1000 grams of propylene oxide per hour per liter of catalyst (or catalyst-filled heating chamber space) is the range most suitable for promoting the formation of allyl alcohol.

The catalytic conversion of propylene oxide to allyl alcohol is conducted at a temperature range of 250 to 550° C., in which the narrow range of 300 to 400° C. is found to be preferable and best suited. Diluents such as toluene vapor, nitrogen, carbon dioxide or water vapor may also be employed to advantage. The catalytic agents promoting the hydroxyl linkage of the oxygen with the hydrogen of the methyl group can suitably be supported or carried by admixture with or being deposited upon the surface of such carriers as glass particles, particles of refractory material (e. g. material sold under the trade-named "Aloxite" and "Alfrax") and the like; or the catalyst may be used without a support or carrier where their physical characteristics so permit.

The following catalytic agents, employed individually or in the form of mixtures thereof, are preferred in the practice of our process:

Chromic oxide ($Cr_2O_3$)
Stannic oxide ($SnO_2$)
Uranium trioxide ($UO_3$)
Urano-uranic oxide ($U_3O_8$)
Nickel oxide (NiO)
Molybdenum trioxide ($MoO_3$)
Ceric oxide ($CeO_2$)
Cobaltous oxide (CoO)
Boron carbide
Carbon in the form of coke
Ferrous oxide (FeO)

The following examples set forth in detail ways in which the process of our invention may be practiced and will enable those skilled in the art more readily to understand the principle thereof. These examples are made by way of illustration and not limitation, the scope of our invention being set forth in the appended claims.

Example 1

Chromic oxide gel catalyst prepared according to specifications as set forth in vol. 63, page 1129 of the Journal of the American Chemical Society, was placed in a glass reactor tube having the dimensions of 25 m. m. inner diameter by 600 m. m. in length. The chromic oxide gel catalyst used was in the amount of 70 cc. in volume. The balance of the reactor tube space was taken up by a catalyst carrier in the form of glass wool. This reactor tube was heated in a furnace at various temperatures for each separate "run" and over a range of 250 to 350° C., as indicated by a thermocouple mounted between the outside wall of the glass tube and the inside of the heating furnace surrounding it.

Commercial propylene oxide was then passed through the tube in several different runs in which the following results were obtained:

(a) At a temperature of 250° C. and a space velocity of 411 grams of propylene oxide per hour per liter of catalyst-and-carrier-occupied heating chamber (or reactor tube) space, 16% by weight of the propylene oxide was reacted during the passage through the tube. Of this amount of conversion, 30% by weight was allyl alcohol, 3% by weight propionaldehyde and the balance representing loss and unknown products. On fractionating the recovered conversion products the allyl alcohol was separated from the propionaldehyde and the other reaction products. The ratio of allyl alcohol to propionaldehyde was 10 to 1.

(b) In a second run, at a temperature of 300° C. and a space velocity of 342 grams of propylene oxide per hour per liter of catalyst-occupied heating chamber space, 27% of the propylene oxide was converted to products, 34% of which was allyl alcohol and 15% propionaldehyde, the balance of 51% being unknowns and loss, giving an alcohol to aldehyde ratio of 2.2 to 1.

(c) In a third run over the same batch of catalyst, but at 350° C. and at a space velocity of 390 grams per hour per liter of catalyst-occupied heating chamber space, 51% of the propylene oxide was converted. 51% of the conversion products was allyl alcohol, 16% propionaldehyde, the unknowns and loss being 33%. This calculates to be an alcohol to aldehyde ratio of 3.2 to 1.

The same batch of catalyst as used in the above described runs of this example was reused repeatedly and with only a slight decrease in its catalytic activity. In fact, after 11 runs on the same batch of catalyst, each run being for a period of time of about 6 hours duration, the yield of allyl alcohol over propionaldehyde still predominated, although the percentage of conversion products did undergo some diminution.

Example 2

Another batch of chromic oxide gel catalyst prepared as described in Example 1, and similarly supported on a glass wool carrier, was used in the same reactor tube and at the same temperature, but with the presence of 2.5% by weight of water mixed with the propylene oxide vapor, and at a relatively slower space velocity of 288 grams per hour per liter of catalyst-occupied heating chamber space. Results obtained were as follows: 53% conversion of propylene oxide of which the conversion products were allyl alcohol 59%, propionaldehyde 20% and the balance of 21% representing unknowns and loss. The ratio of allyl alcohol to propionaldehyde in the conversion products was thus approximately 3 to 1.

Example 3

The same reactor tube as employed in Examples 1 and 2 above was filled with 210 cc. of catalyst in the form of a pelleted mixture of chromic oxide and activated alumina (⅛ inch pellets of "chromic alumina catalyst" as commercially supplied by the Harshaw Chemical Co.). Commercial propylene oxide in the amount of 210 grams and containing 10 grams of water, were passed through the reactor tube over a period of 6⅔ hours, and at a space velocity of 156 grams per hour per liter of heating chamber space occupied by the catalyst. The heating temperature was 225° C. The propylene oxide conversion products were in the amount of 80%, and 25% of which was allyl alcohol, and 13.2% of which was propionaldehyde, as determined by fractional distillation. Thus it will be seen, that in this example, the ratio of alcohol to aldehyde dropped down to 1.9 to 1. This is attributable to the presence of the catalyst (activated alumina) promoting the formation of the double bond linkage of the oxygen atom of the propylene oxide. However, even with such a catalyst present the pronounced activity of the chromic oxide catalyst of our invention is still sufficiently great to effect the predominance of allyl alcohol in the conversion products.

Employing other catalysts, at indicated temperatures and space velocities (or catalyst contact time), results were obtained as set forth in the following table of examples:

| Ex. No. | Catalyst | ° C. | Space Velocity | Conversion | Propionaldehyde | Ally Alcohol | Ratio of Allyl Alcohol to Propionaldehyde |
|---|---|---|---|---|---|---|---|
| 4 | $UO_3$ | 400 | 113 | 5.4 | 13.3 | 42 | 3.1:1 |
| 5 | $U_3O_8$ | 400 | 119 | 33 | 7 | 16 | 2.3:1 |
| 6 | $MoO_3$ | 350 | 191 | 21 | 5 | 18 | 3.6:1 |
| 7 | $Cr_2O_3$ and $SnO_2$ | 350 | 136 | 25 | 6.7 | 52 | 7.7:1 |
| 8 | $Cr_2O_3$ and $NiO$ | 300 | 102 | 31 | 17 | 48 | 3.8:1 |
| 9 | $CeO_2$ | 400 | 455 | 11 | 18 | 12 | .67:1 |
| 10 | $CoO$ | 400 | 350 | 10 | 11 | 35 | 3.2:1 |
| 11 | Boron Carbide | 400 | 304 | 19 | 28 | 14 | .5:1 |
| 12 | Coke | 400 | 205 | 19 | 15 | 31 | 2:1 |
| 13 | $FeO$ | 400 | 160 | 90 | 20 | 11 | .55:1 |

It is recognized that the metallic oxide catalysts added may be reduced in part, such as $MoO_3$ to $MoO_2$ or $SnO_2$ to $SnO$ or even $Sn$ and it is to be understood that in the claims these reduction products are to be included as within the scope of the definition of the particular oxides called for therein.

Equivalent modes of practicing our invention may be followed provided that they are within the scope and purview of the appended claims.

We, therefore, distinctly claim and particularly point out as our invention:

1. The method of converting propylene oxide to a product in which the ratio of allyl alcohol to propionaldehyde is at least 2.3 to 1, comprising passing vaporized propylene oxide through a heating chamber space in the absence of a gas reactive with said propylene oxide and at a temperature of 250 to 550° C., in contact with a molecular rearrangement catalyst consisting essentially of those selected from the group consisting of chromic oxide, nickel oxide, stannic oxide, urano-uranic oxide, uranium trioxide, molybdenum trioxide, and cobaltous oxide; and at a space velocity of 100 to 1000 grams of propylene oxide per hour per liter of heating chamber space occupied by the catalyst.

2. The method of converting propylene oxide to a product in which the ratio of allyl alcohol to propionaldehyde is at least 3 to 1, comprising passing a vapor consisting predominantly of propylene oxide through a heating chamber in contact with a chromic oxide gel catalyst and at a temperature of 250–350° C.

LESTER G. LUNDSTED.
EDWARD J. SCHWOEGLER.
EDWARD C. JACOBS.

REFERENCES CITED

The following references are of record in the file of this patent:

UNITED STATES PATENTS

| Number | Name | Date |
|---|---|---|
| 1,787,205 | Loehr | Dec. 30, 1930 |
| 1,917,179 | Young | July 4, 1933 |
| 2,159,507 | Law | May 23, 1939 |

FOREIGN PATENTS

| Number | Country | Date |
|---|---|---|
| 320,424 | Great Britain | Oct. 17, 1929 |
| 331,185 | Great Britain | Mar. 18, 1929 |